(12) United States Patent
Ma et al.

(10) Patent No.: US 12,499,908 B2
(45) Date of Patent: Dec. 16, 2025

(54) SINGLE ARM STEPPER ELEVATION SYSTEM

(71) Applicant: Seagate Technology LLC, Fremont, CA (US)

(72) Inventors: YiChao Ma, Singapore (SG); Xiong Liu, Singapore (SG); Choon Kiat Lim, Singapore (SG); Than Zaw Myint, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 166 days.

(21) Appl. No.: 18/530,600

(22) Filed: Dec. 6, 2023

(65) Prior Publication Data
US 2024/0221780 A1   Jul. 4, 2024

Related U.S. Application Data

(60) Provisional application No. 63/477,585, filed on Dec. 29, 2022.

(51) Int. Cl.
| | | |
|---|---|---|
| *G11B 21/12* | (2006.01) | |
| *G11B 5/48* | (2006.01) | |
| *G11B 5/54* | (2006.01) | |
| *G11B 17/02* | (2006.01) | |
| *G11B 21/22* | (2006.01) | |

(52) U.S. Cl.
CPC ............... *G11B 21/12* (2013.01); *G11B 5/48* (2013.01); *G11B 5/4813* (2013.01); *G11B 5/54* (2013.01); *G11B 17/021* (2013.01); *G11B 21/22* (2013.01)

(58) Field of Classification Search
None
See application file for complete search history.

(56) References Cited

U.S. PATENT DOCUMENTS

| | | | | |
|---|---|---|---|---|
| 3,311,902 A | * | 3/1967 | Appleton | G11B 17/021 360/267.9 |
| 4,092,681 A | * | 5/1978 | Dix et al. | G11B 17/021 360/98.02 |
| 4,348,705 A | * | 9/1982 | Mittal et al. | G11B 17/021 360/98.04 |
| 7,986,491 B2 | * | 7/2011 | Albrecht et al. | G11B 17/021 360/98.07 |
| 8,112,580 B2 | | 2/2012 | Bandic et al. | |
| 10,269,380 B1 | * | 4/2019 | Sun et al. | G11B 17/021 |
| 10,811,044 B2 | * | 10/2020 | Myers et al. | G11B 5/4813 |
| 10,916,271 B1 | | 2/2021 | Jacoby et al. | |

(Continued)

*Primary Examiner* — Craig A. Renner
(74) *Attorney, Agent, or Firm* — Westman, Champlin & Koehler, P.A.

(57) ABSTRACT

A data storage device includes a data storage disk, an arm, a first head, an elevator, and a sleeve. The data storage disk has a first read/write surface defining an x-y plane. The arm is attached to a pivot block, wherein the arm is movable relative to the disk. The first head is supported by the arm, wherein the first head is configured to interact with the first read/write surface. The elevator is configured to move the arm in a z direction, wherein the elevator comprises a stepper motor, a gear train, and a lead screw. The sleeve partially encases the lead screw. In another aspect, a data storage device includes a data storage disk, an arm, a first head, an elevator, and a housing encasing the gear train and attached to the pivot block.

20 Claims, 12 Drawing Sheets

(56) References Cited

U.S. PATENT DOCUMENTS

| | | |
|---|---|---|
| 10,978,100 B1 * | 4/2021 | Myers .................. G11B 5/4813 |
| 11,031,037 B1 | 6/2021 | Garbarino |
| 11,176,963 B1 | 11/2021 | Herdendorf et al. |
| 11,423,927 B2 | 8/2022 | Mendonsa et al. |
| 2020/0372931 A1 | 11/2020 | Tu et al. |
| 2021/0012797 A1 * | 1/2021 | Nguyen et al. .......... G11B 5/54 |
| 2021/0020194 A1 * | 1/2021 | Nguyen et al. ...... G11B 5/4813 |

* cited by examiner

SINGLE ARM STEPPER ELEVATION SYSTEM

CROSS REFERENCE TO RELATED APPLICATIONS

This application claims the benefit of priority from U.S. provisional patent application 63/477,585, filed Dec. 29, 2022. The priority application is fully incorporated herein by reference.

SUMMARY

In one embodiment, a data storage device comprises a data storage disk, an arm, a first head, an elevator, and a sleeve. In an exemplary embodiment, the data storage disk has a first read/write surface defining an x-y plane. In an exemplary embodiment, the arm is attached to a pivot block, wherein the arm is movable relative to the disk. In an exemplary embodiment, the first head is supported by the arm, wherein the first head is configured to interact with the first read/write surface. In an exemplary embodiment, the elevator is configured to move the arm in a z direction, wherein the elevator comprises a stepper motor, a gear train, and a lead screw. The sleeve partially encases the lead screw.

In another embodiment, a data storage device comprises a data storage disk, an arm, a first head, an elevator, and a housing. In an exemplary embodiment, the data storage disk has a first read/write surface defining an x-y plane. In an exemplary embodiment, the arm is attached to a pivot block, wherein the arm is movable relative to the disk. In an exemplary embodiment, the first head is supported by the arm, wherein the first head is configured to interact with the first read/write surface. In an exemplary embodiment, the elevator is configured to move the arm in a z direction, wherein the elevator comprises a stepper motor, a gear train, and a lead screw. In an exemplary embodiment, the housing encases the gear train and is attached to the pivot block.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. All descriptions are applicable to like and analogous structures throughout the several embodiments, unless otherwise specified.

Figure 1:
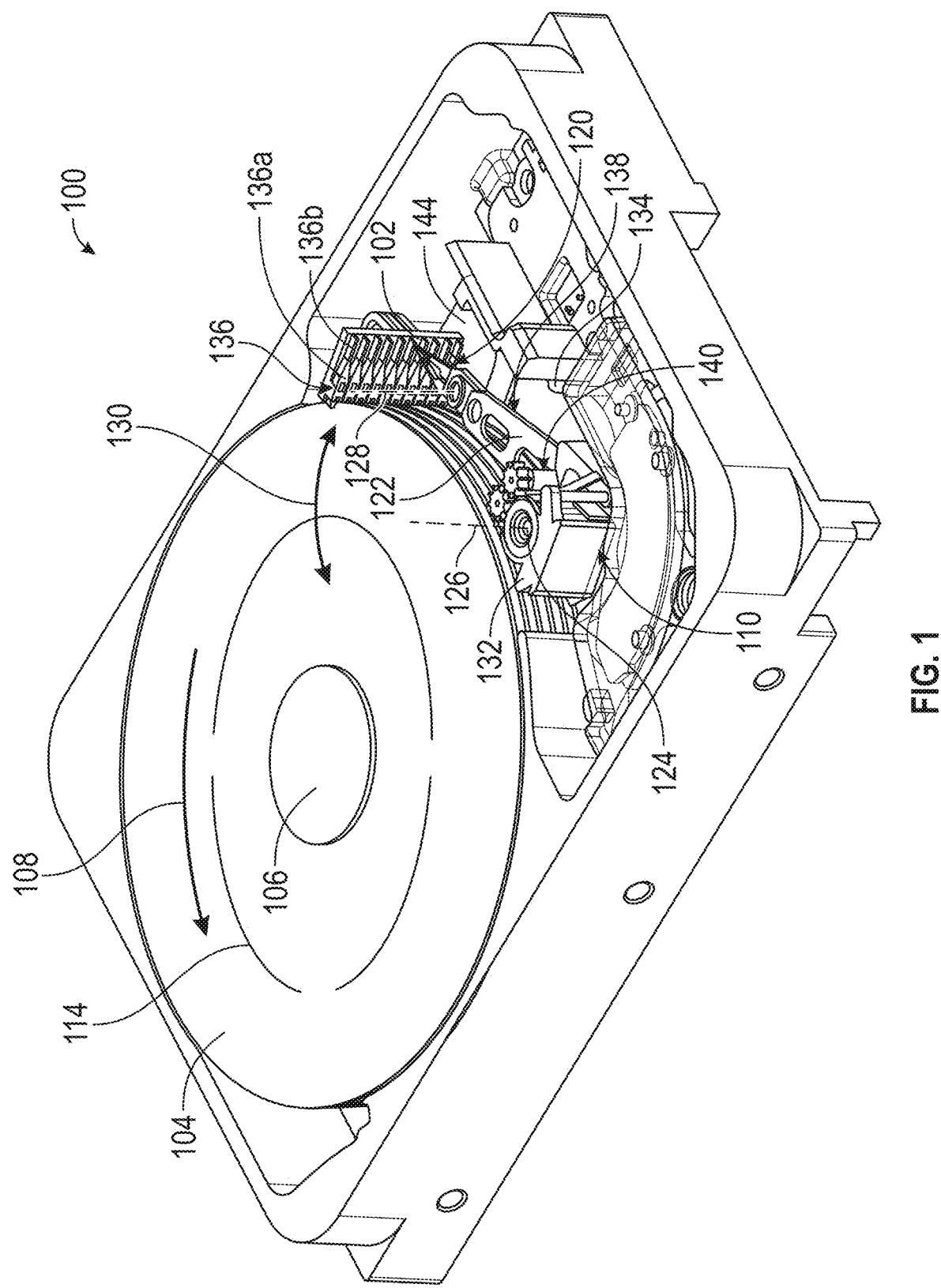
FIG. 1 is a schematic illustration of an exemplary data storage device.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

The same or similar reference numerals are used in different figures for the same or similar elements. All descriptions of an element also apply to all other versions of that element unless otherwise stated. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse,"

"clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments in which the elements are indirectly connected, coupled or attached to each other.

In a conventional hard disk drive (HDD), a number of read/write heads is equal to a number of disk surfaces. The heads are held on a corresponding number of arms attached to an E-block; the E-block is rotated to positioning the heads over their corresponding disk surfaces. There is typically no up/down movement of the heads in such HDDs. However, in a data storage device (DSD) using an "elevator" drive, the number of heads employed is less than the number of disk surfaces, and a head stack assembly (HSA) including the fewer number of heads is moved up and down to enable the fewer head(s) to read from multiple disk surfaces. The up and down movement is possible when the HSA is rotated such that the heads are away from the disks. When not directly over or under a disk, the head(s) typically are supported on a ramp.

FIG. 1 shows an illustrative operating environment in which certain embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

FIG. 1 is a schematic illustration of a data storage device 100 in which heads 102 may be positioned over or under storage media 104 to read data from and/or write data to the data storage media 104. In the embodiment shown in FIG. 1, the data storage media 104 are rotatable data storage disks, with each disk 104 having opposing surfaces that serve as data storage surfaces. For read and write operations, a spindle 106 rotates the stack of media disks 104 as illustrated by arrow 108. An actuator mechanism 110 positions the heads 102 relative to data tracks 114 on the rotating media 104 between an inner diameter (ID) and an outer diameter (OD). Both the spindle 106 and actuator mechanism 110 are connected to and operated through drive circuitry.

In general, in order to keep read/write heads 102 from landing on disks 104 in a data storage device 100 when, for example, power is removed from the data storage device 100, and to prevent the heads 102 from colliding with outer edges of the disks 104 during load and unload operations, a head support ramp assembly 136 is provided adjacent to the OD of the disks 104. In an exemplary data storage device 100, a number of heads 102 is less than a number of disk 104 surfaces. In an exemplary embodiment, each disk 104 has a top data storage surface and a bottom data storage surface.

Figure 3A:
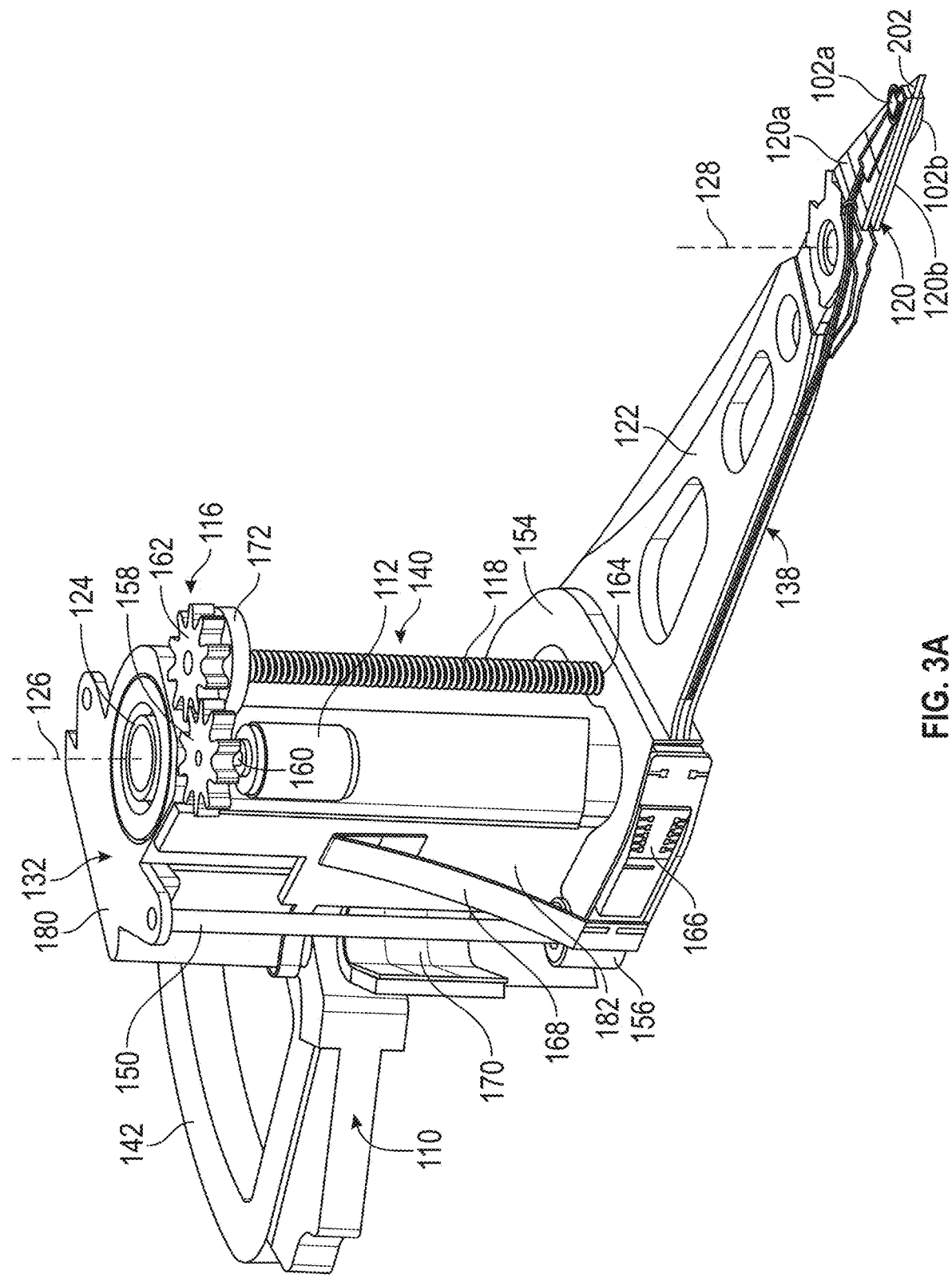
FIG. 3A is a side perspective view of the exemplary head stack assembly with an elevator positioning the actuator arm at its lowest position.
Figure 3B:
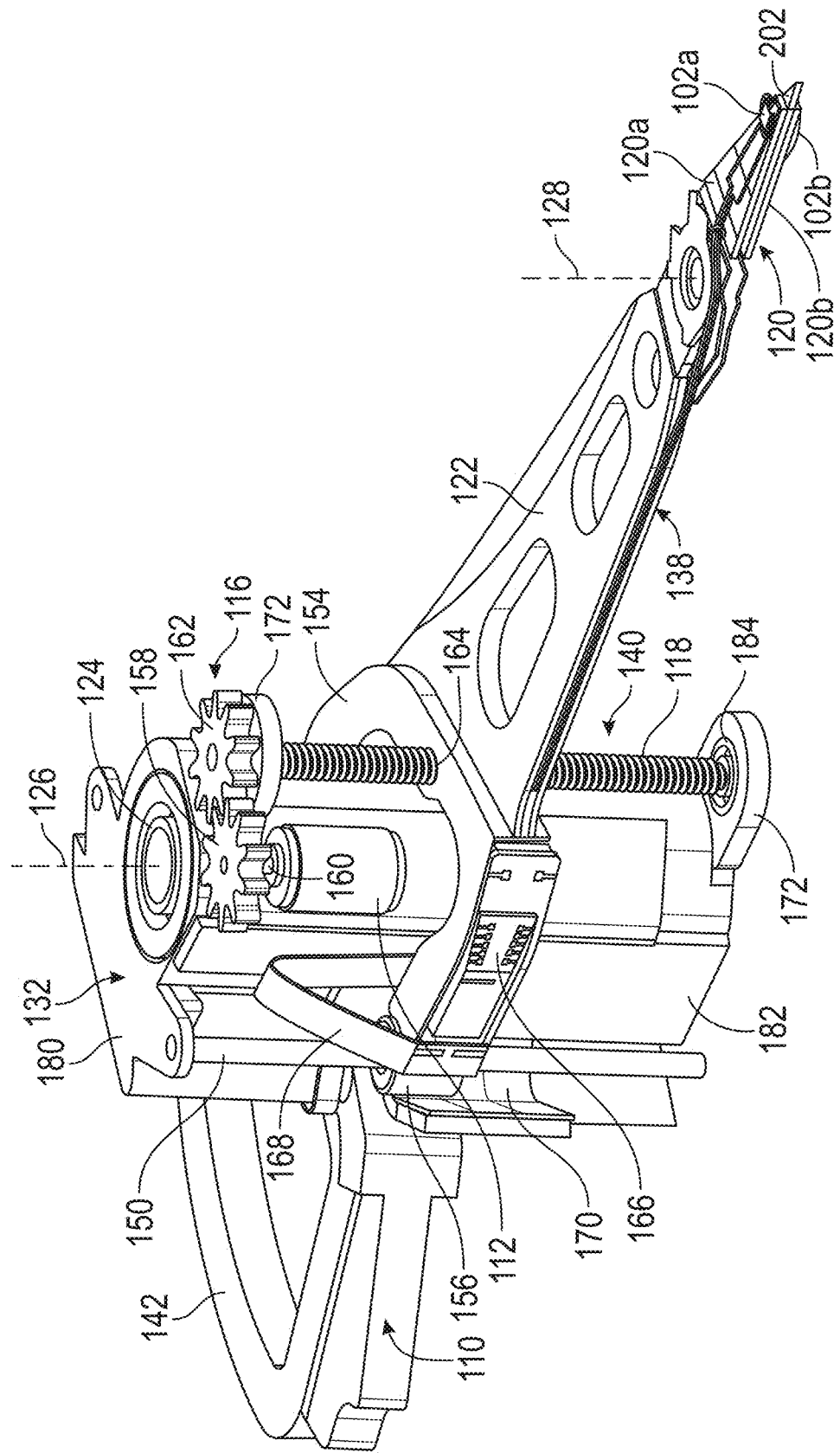
FIG. 3B is a side perspective view of the exemplary head stack assembly with the elevator positioning the actuator arm at an intermediate position.
Figure 3C:
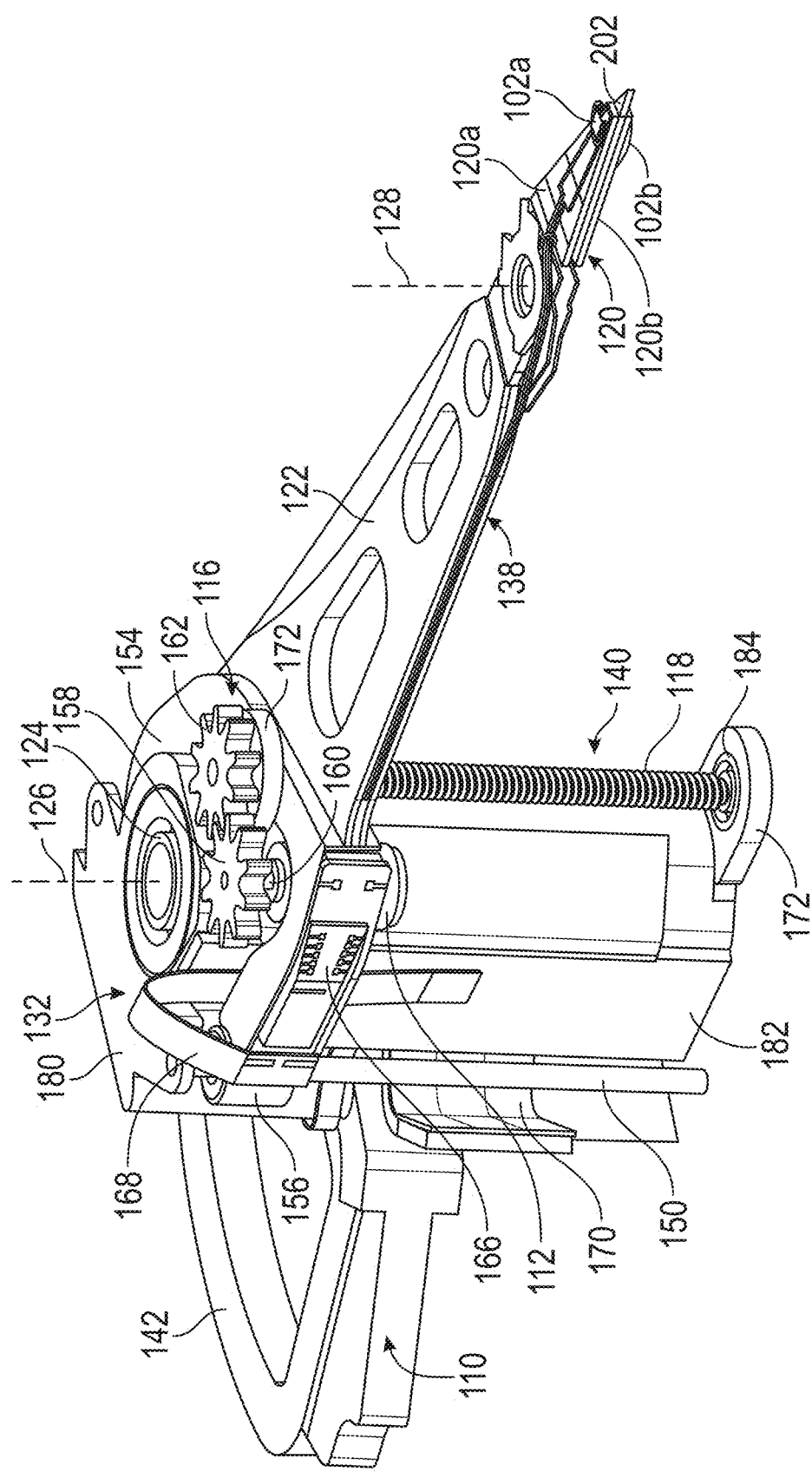
FIG. 3C is a side perspective view of the exemplary head stack assembly with the elevator positioning the actuator arm at its highest position.

Each of heads 102 is coupled to the actuator mechanism 110 through a suspension assembly that includes a load beam 120 connected to an actuator arm 122 of the mechanism 110, for example through a swage connection. The actuator mechanism 110 is rotationally coupled to a frame or base deck 144 through a bearing 124 to rotate about axis 126. The actuator mechanism 110 moves the heads 102 in a cross-track direction as illustrated by arrow 130. Each of the heads 102 includes one or more transducer elements coupled to head circuitry through a flex circuit 134. The actuator mechanism 110, the load beam 120 and the actuator arm 122 are collectively referred to as a head stack assembly (HSA) 138. In data storage device 100 of FIG. 1, the HSA 138 may be moved along axis 126 to different positions under motive of an elevator 140. In an exemplary embodiment, as shown in FIG. 3C, at an uppermost position of HSA 138, the heads 102a, 102b interact with the lower surface of the uppermost disk 104 and the upper surface of the second uppermost disk 104, respectively. In other positions of arm 122 that are below the uppermost position (such as shown in FIGS. 1, 3A and 3B), the same heads 102a, 102b interact with data storage surfaces of lower disks of the stack of disks 104 carried on spindle 106.

Figure 2:
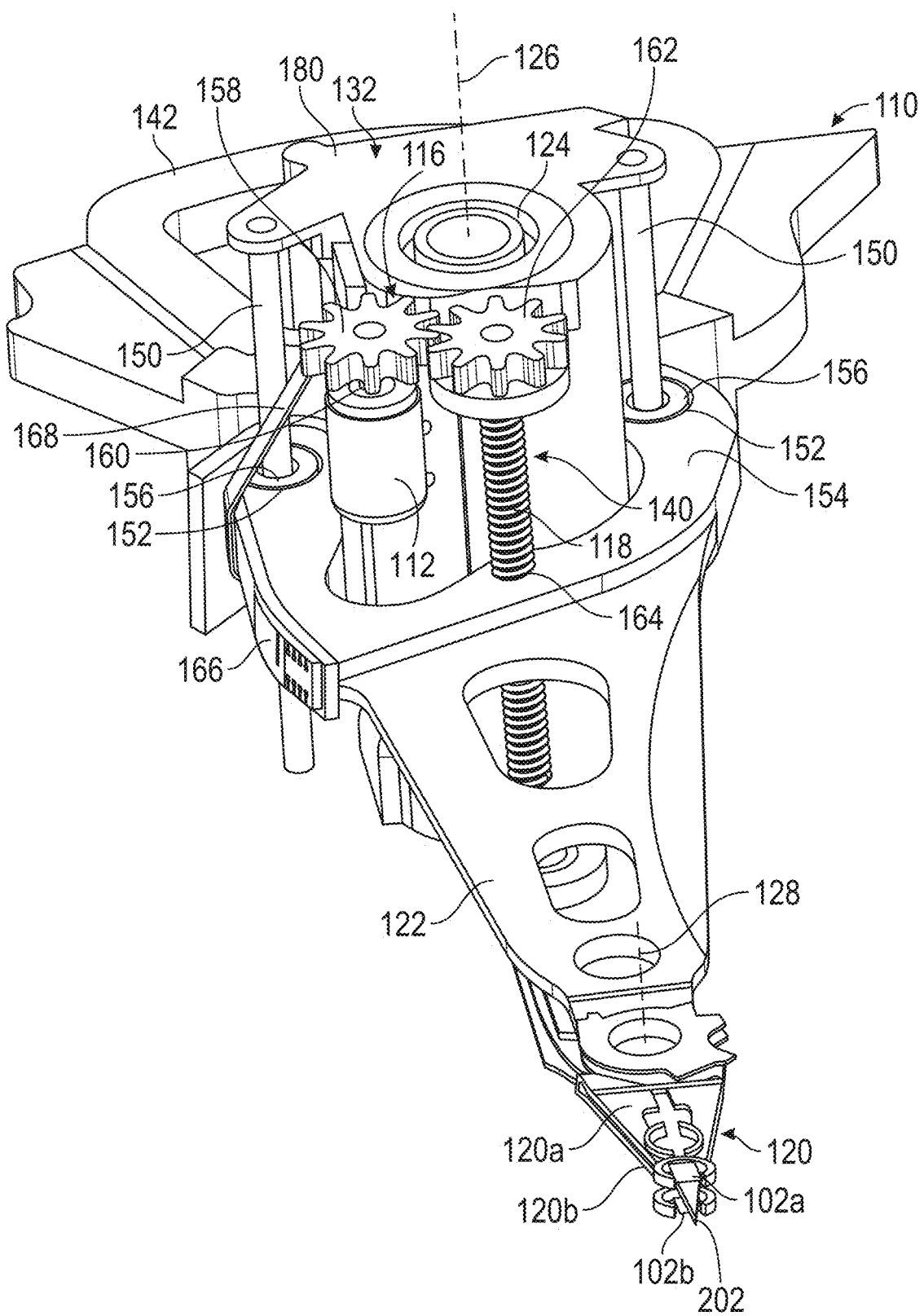
FIG. 2 is a perspective view of an exemplary head stack assembly, viewed from its head end.
Figure 4:
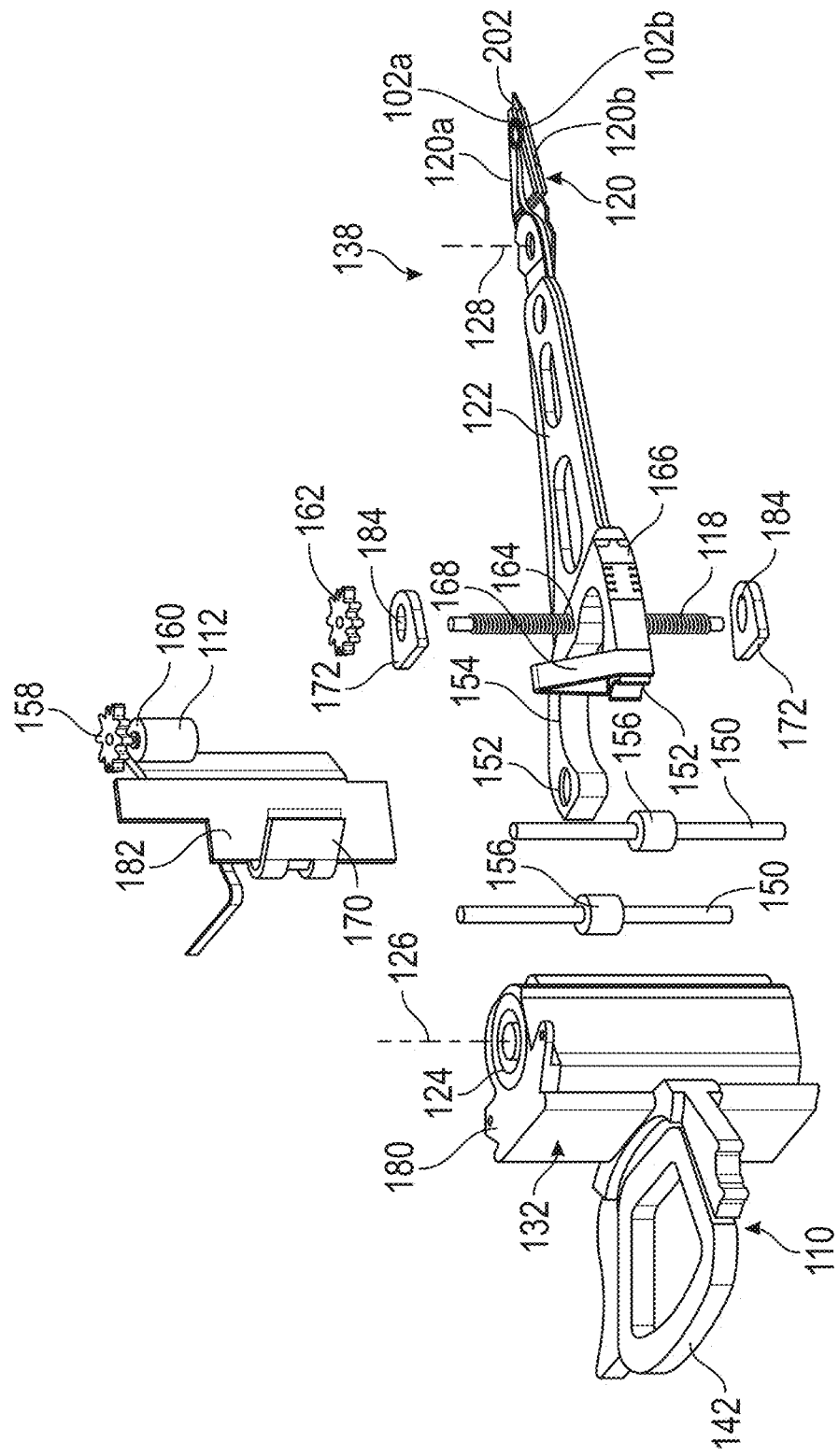
FIG. 4 is an exploded side perspective view of the exemplary head stack assembly.

As shown in FIGS. 2-4, in an exemplary embodiment, actuator arm 122 carries upper and lower load beam suspensions 120a, 120b. In an exemplary embodiment, upper load beam suspension 120a carries an upwardly facing head 102a configured to read/write data to/from a disk surface above the head 102a. In such an embodiment, lower load beam suspension 120b carries a downwardly facing head 102b configured to read/write data to/from a disk surface of a vertically adjacent disk below the head 102b. However, configurations of head support structures and head locations and orientations other than those illustrated could be used.

As shown in FIG. 1, in an exemplary embodiment, head support ramp assembly 136 supports a tab 202 at a head end of load beam 120 when the HSA 138 is moved away from the data storage disk(s) 104. In some embodiments, head support ramp 136 includes a first ramp portion 136a adjacent to the OD of the data storage disks 104 and a second ramp portion 136b adjacent to the first ramp portion 136a. In order to move the HSA 138 from either an upper position to a lower position or from a lower position to an upper position, the HSA 138 is first rotated about axis 126, or otherwise moved in the x-y plane, until tab 202 is supported on the moveable portion 136b of the head-support ramp assembly 136. Then, the HSA 138 and the moveable portion 136b are moved in unison vertically (for example, in a z direction). An entire ramp 136 or a portion thereof can also be moved in the x-y plane off the disk stack, such as by retraction, flexing, or rotation, for example. Other ramp configurations can also be used, such as those described in the following commonly owned patents, which are hereby incorporated by reference: U.S. Pat. No. 11,094,347, entitled "Split Ramp for Data Storage Devices;" and U.S. Pat. No. 11,348,610, entitled "Movable Ramp with Arm Engaging Bracket for an Elevator Drive on a Magnetic Disc Recording Device." Thus, the HSA 138 moves up and down to access data from multiple disk surfaces in the DSD 100.

For use of heads 102 for reading and writing data relative to disk 104, actuator 110 is activated to rotate the actuator arm 122, to thereby move the head end of HSA 138 off of the head support ramp assembly 136 and to the disk 104. To move the head end of HSA 138 onto or off a disk 104, arm 122 rotates about cylindrical bearing 124 and pivot axis 126. As shown in FIG. 1, rotation of arm 122 about pivot axis 126 results in moving the head end of HSA 138 in an arc-shaped cross track direction 130 that is not truly on a radius of the disk 104. Accordingly, with a rotary actuator arm 122, in some positions of the head 102 on disk 104, there is some skew between the head orientation and the true track orientation of a track 114. Accordingly, in some embodiments, load beam 120 rotates relative to the actuator arm 122 at a second pivot axis 128 to reduce or eliminate any skew angle and align one or more heads 102 with a selected track 114. In an exemplary embodiment, HSA 138 is able to position head 102 relative to disk 104 in a selected cross disk position along arc 130 (about a first pivot axis 126) and with a corrected zero skew orientation of the head 102 relative to any particular track 114 due to rotation of load beam 120 relative to actuator arm 122 about a second pivot axis 128. Additional details on a suitable arm configuration with a second pivot are described in the following commonly owned patent, which is hereby incorporated by reference: U.S. Pat. No. 11,468,909, entitled "Zero Skew with Ultrasonic Piezoelectric Swing Suspension."

In an exemplary embodiment, elevator 140 achieves vertical movement (in the z-direction) of the actuator arm 122 with a small stepper motor 112, a gear train 116 and a lead screw 118. In an exemplary embodiment, the stepper motor 112 is mounted at the side of a pivot block 132 and away from the voice coil motor (VCM) 142 of actuator mechanism 110, to avoid the magnetic field influence from the VCM 142.

FIGS. 3A-3C show different vertical positions of the actuator arm 122 along lead screw 118. In an exemplary embodiment, head 102a is an upwardly facing head, configured to read and write to a disk surface above the head 102a. Head 102b is a downwardly facing head, configured to read and write from a disk surface under the head 102b. In an exemplary embodiment, HSA 138 moves the actuator arm 122 to z-direction locations that are between two disks 104 of the stack of disks shown in FIG. 1. In one embodiment, each of the upper most and lower most disks are single surface disks so that the upper most surface of the stack and the lower most surface of the stack are not data storage surfaces. Thus, the heads 102 are protected from collisions with the base stack 144 and lid (not shown) of the data storage device 100.

In an exemplary embodiment, two guide shafts 150 are attached at their top ends to plate 180 of pivot block 132 and attached at their bottom ends to base deck 144. In an exemplary embodiment, the guide shafts 150 pass through linear bearings 156, which are fixed within aperture or notch 152, respectively, of arm bracket 154. For example, a linear bearing 156 may be adhered to its aperture or notch 152 by a pressure sensitive adhesive. In an exemplary embodiment, arm bracket 154 is fixed to actuator arm 122 so that these components move together up and down via elevator 140 and around pivot bearing 124 about axis 126. In an exemplary embodiment, linear bearings 156 are disposed at locations 152 to smoothly guide arm bracket 154 in its vertical motion (in a z direction) up and down along the guide shafts 150. Suitable linear bearings 156 are commercially available from MPS Micro Precision Systems AG of Switzerland as miniature linear bearings. In an exemplary embodiment, a motive force for the vertical motion of arm bracket 154, and therefore also of actuator arm 122, is provided by stepper motor 112 through gear train 116 and lead screw 118.

In an exemplary embodiment, gear train 116 includes drive gear 158 connected to drive shaft 160 of stepper motor 112. The drive gear 158 is intermeshed with the driven gear 162 to rotate in opposed directions. Driven gear 162 is fixed to lead screw 118 to rotate therewith. Lead screw 118 is externally threaded, to cooperate with an internally threaded aperture 164 of arm bracket 154. Thus, as driven gear 162 rotates about the longitudinal axis of lead screw 118, the lead screw 118 turns with the driven gear 162, thereby causing the threaded connection of arm bracket 154 at internally threaded aperture 164 to move up and down. In an exemplary embodiment, the horizontal orientation of arm bracket 154 and actuator arm 122 is maintained by the three parallel and vertical linear axes of the lead screw 118 and each guide shaft 150. Rotation of driven gear 162 in a first direction causes actuator arm 122 to move upward; rotation of driven gear 162 in an opposite direction causes the actuator arm 122 to move downward, depending on the pitch and orientation of the threads of lead screw 118 and aperture 164. Thus, elevator 140 allows the heads 102 held at the end of load beam 120 to travel up and down to the vertical levels of various disks 104 held in a stack on spindle 106. Additionally, voice coil motor 142 of actuator mechanism 110 allows for rotation of the entire pivot block 132 and its attached elevator 140 and actuator arm 122 about pivot axis 126 of pivot bearing 124. Thus, the heads 102 can access any track 114 of data on any disk 104.

In an exemplary embodiment, electrical signals from heads 102 are communicated through a trace gimbal assembly across the load beam 120 and to electrical terminals 166. A flex on suspension (FOS) 168 electrically connects the data from the electrical terminals 166 with printed circuit cable assembly (PCCA) 182 and connector 170. In an exemplary embodiment, the FOS 168 comprises a polymeric layer and an electrical trace supported by the polymeric layer. The connector 170 is in turn electrically connected, via flex circuit 134 (labeled in FIG. 1), to a control board (not shown) usually mounted on base deck 144. Additional details regarding suitable electrical connections in a data storage device are described in commonly owned U.S. Pat. No. 7,646,567 for "Flex on suspension with a heat-conducting protective layer for reflowing solder interconnects," which is hereby incorporated by reference.

As shown in FIGS. 3A-5A and 5D, in an exemplary embodiment, bearing caps 172 are connected to pivot block 132 and include bearing collars 184 to allow for the rotation of lead screw 118 about its longitudinal axis, as the rotation is controlled by driven gear 162. The caps 172 serve as hard stops at both ends of lead screw 118 that limit the extent of upward and downward movement of the HSA 138. As shown in FIGS. 5A, 5C, 5D and 5G-5I, in an exemplary embodiment, a screw housing 148 is provided in the form of a sleeve attached to bearing caps 172. In an exemplary embodiment, housing 148 does not completely surround lead screw 118 but rather has an open slot or slit 174 to allow for the vertical travel of tail 192 of threaded nut 188. Further, the provision of slit 174 prevents binding by allowing any generated particles resulting from the rotational motion of lead screw to escape. Slit 174 is positioned to face away from disks 104 so that the screw housing 148 provides a shroud in directions facing the stack of disks 104 to prevent any particles from traveling toward the direction of the disks. In an exemplary embodiment, screw housing 148 is provided as a generally cylindrically shaped sheet of steel.

Figure 5A:
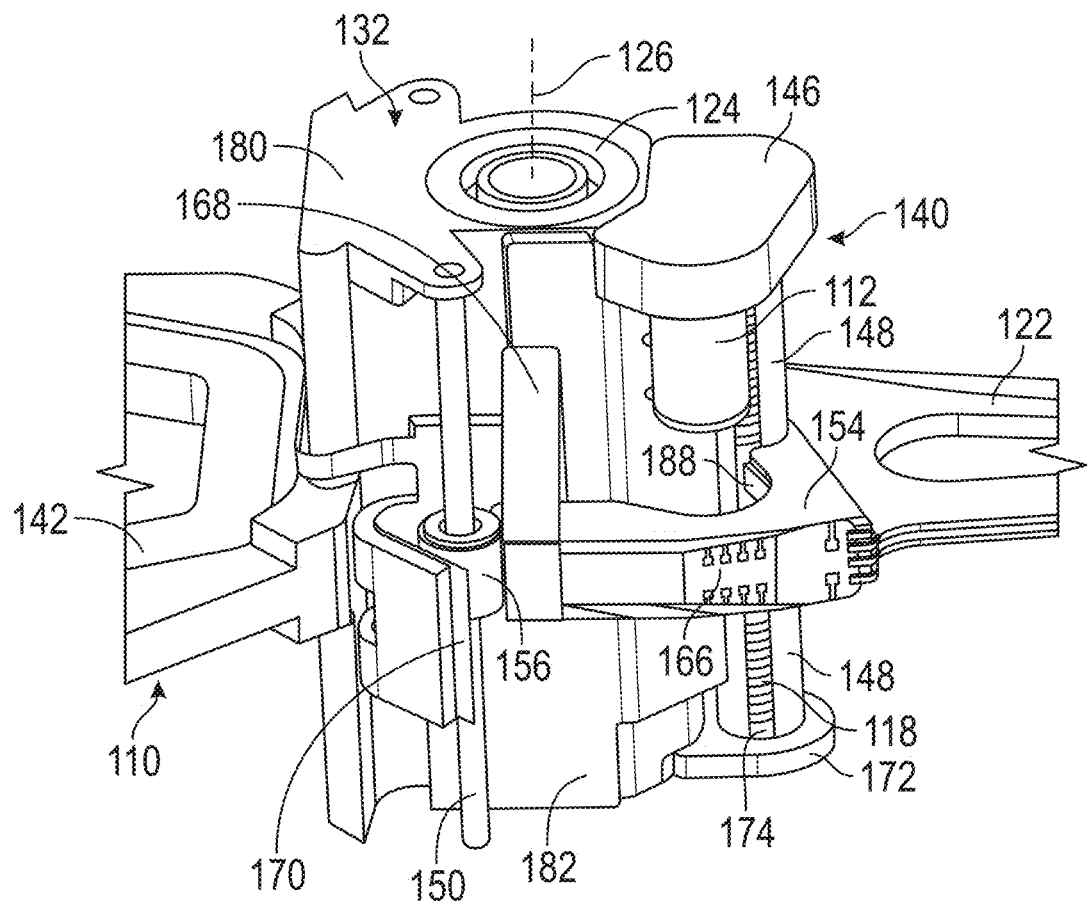
FIG. 5A is an enlarged view of a pivot block portion of the exemplary head stack assembly, showing a gear housing over the gear train and a screw housing over the lead screw.
Figure 5B:
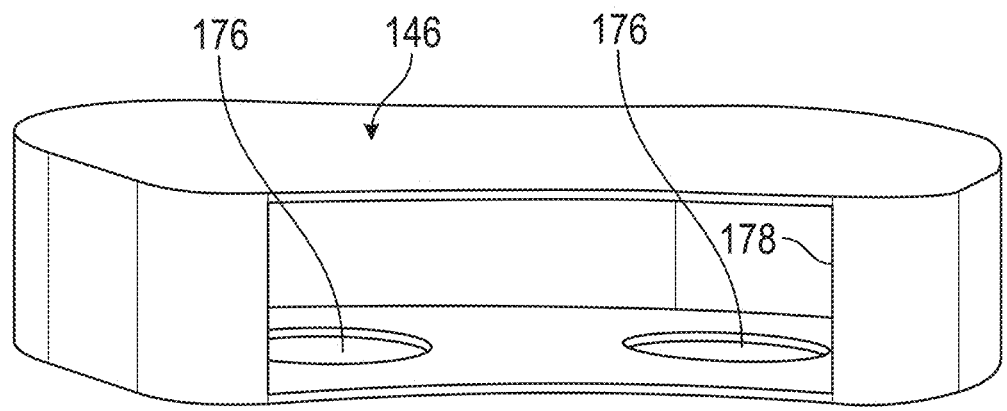
FIG. 5B is a perspective view of the gear housing.
Figure 5C:
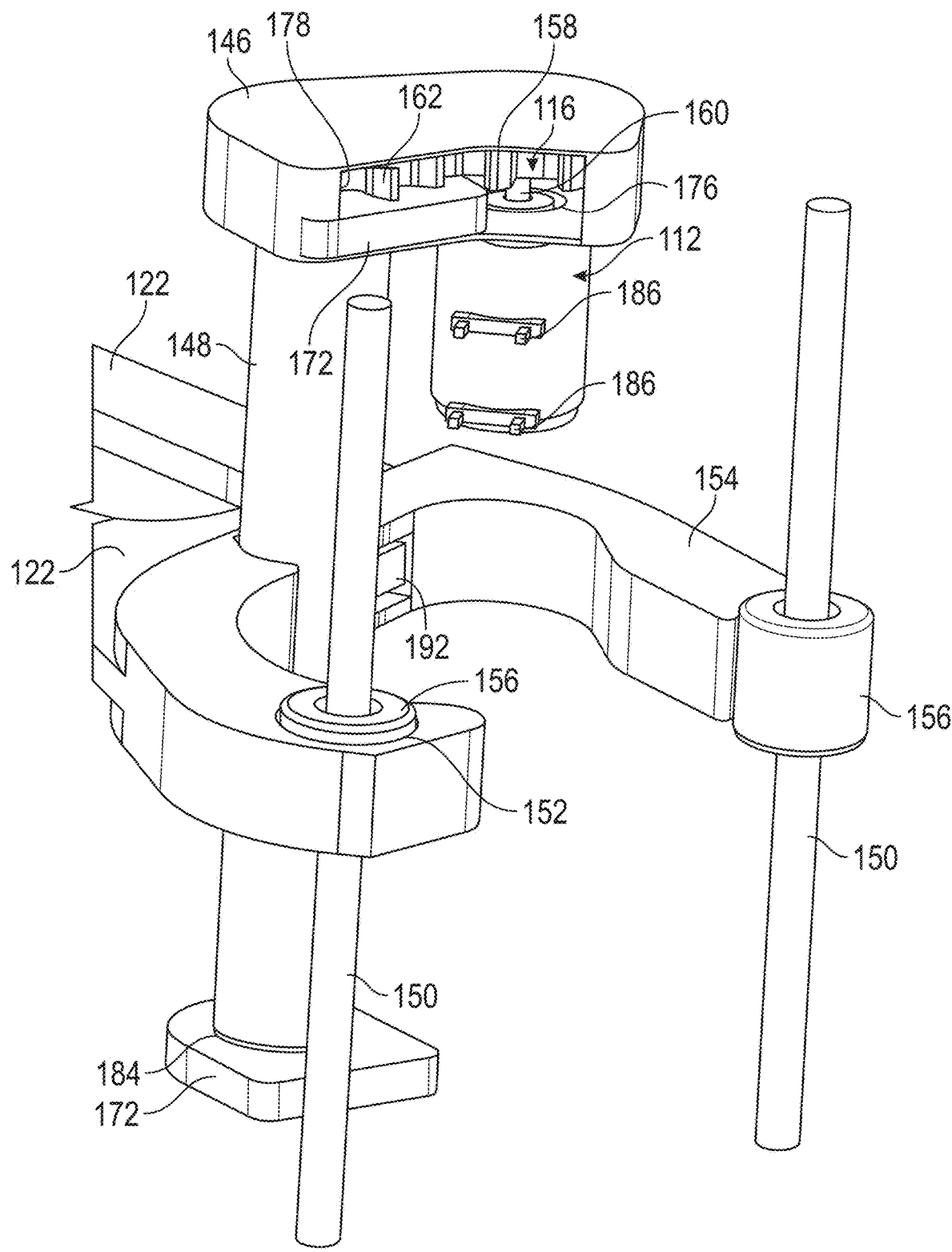
FIG. 5C is a perspective view of a portion of the head stack assembly from the location of the removed pivot block.
Figure 5D:
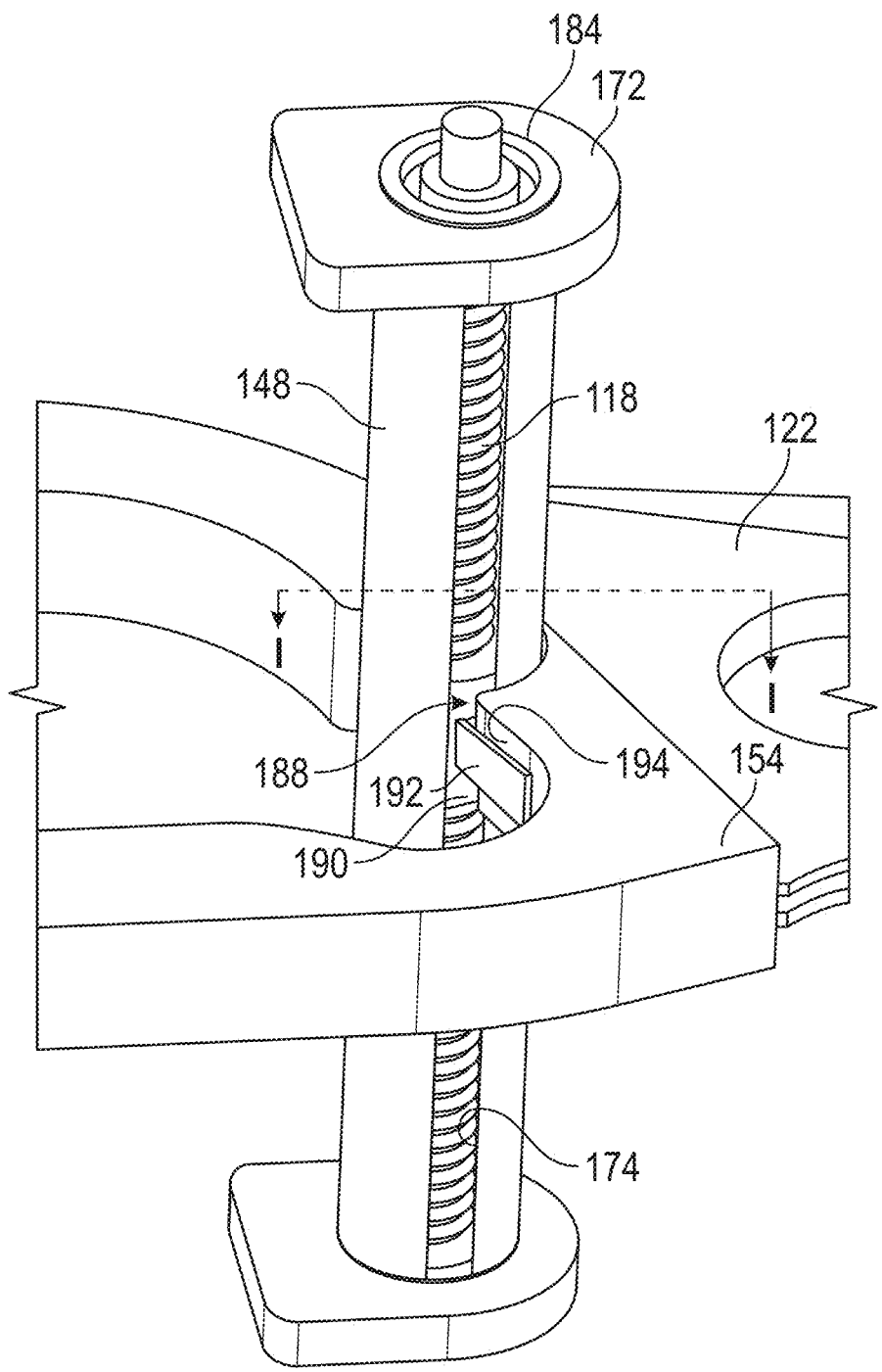
FIG. 5D is a perspective view of the screw housing and surrounding components.
Figure 5E:
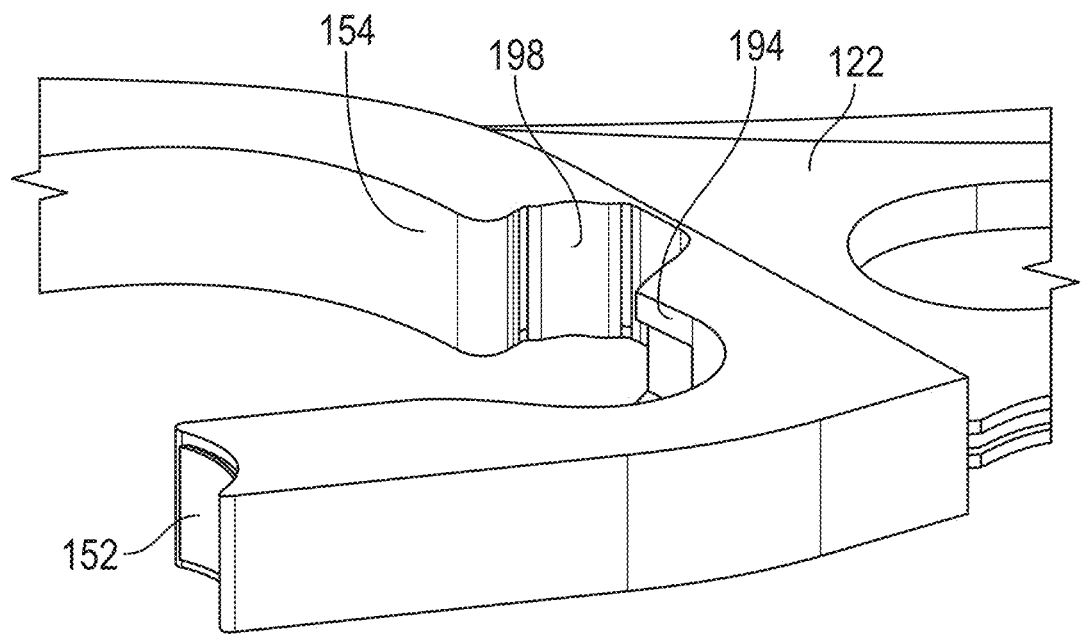
FIG. 5E is an enlarged partial perspective view of a portion of the arm bracket configured to surround the screw housing.
Figure 5F:
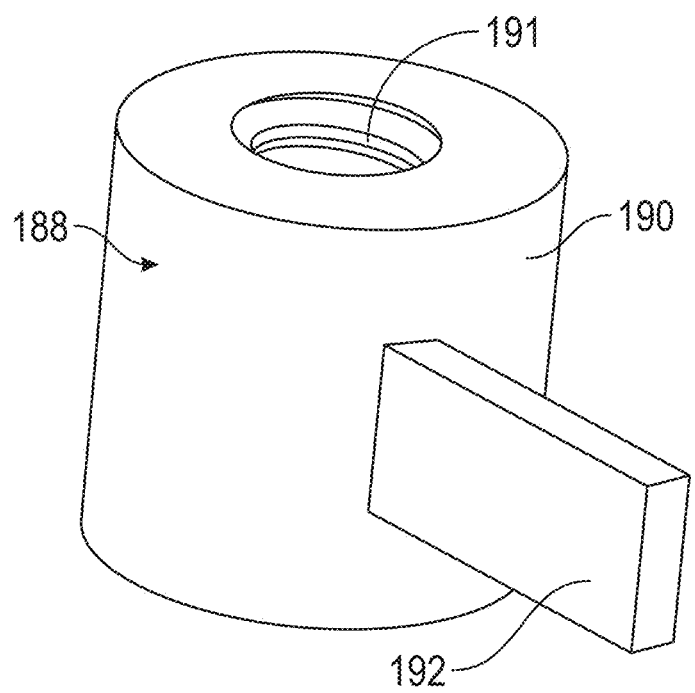
FIG. 5F is a perspective view of a threaded nut configured to move along the lead screw.

FIGS. 5A-5C illustrate the use of gear housing 146 over the gears 158, 162 of the gear train 116. As shown in FIG. 5B, in an exemplary embodiment, gear housing 146 includes two apertures 176 to allow for passage of the drive shaft 160 of stepper motor 112 connected to drive gear 158 and the lead screw portion 118 connected to driven gear 162. Moreover, an opening 178 is provided to allow for installation of the housing 148 over the gear train 116. When installed, as shown in FIG. 5A, opening 178 is placed against the pivot block 132. In an exemplary embodiment as shown in FIGS. 5A-5I, gear housing 146 is used to cover the gear train 116, and a screw housing 148 is used to cover the lead screw 118. Both the gear housing 146 and the screw housing 148 protect the disks 104 from any particles that may be generated upon motion of the gear train 116 and lead screw 118.

FIG. 5C is a perspective view of some components of FIG. 5A, taken from the location of the removed pivot block 132. An exemplary stepper motor 112 is commercially available from Minebea Mitsumi of Tokyo, Japan as a PM type motor with size SM3.4-F20. An exemplary stepper motor 112 has connection pins 186 for attachment to pivot block 132. Drive shaft 160 of the stepper motor 112 extends through aperture 176 of gear housing 146 to driveably couple with drive gear 158. The teeth of drive gear 158 are intermeshed with the teeth of driven gear 162 to impart opposite direction rotation to the driven gear 162 and its operably connected lead screw 118, which is not visible in this view within screw housing 148. An exemplary lead screw is commercially available from IMC Intertech, LLC of Lake Forest, California as a miniature lead screw having a diameter of 1.0 millimeter, a pitch of 0.1 millimeter, and formed of 440C and 420J2 stainless steel. In the embodiment of FIGS. 2-4, in which the lead screw 118 does not have a shroud or housing, the interiorly threaded aperture 164 of arm bracket 154 acts as a follower on the threads of the lead screw 118, thereby causing the arm bracket 154 and the attached arm 122 to travel vertically up and down the lead screw 118. However, in the version of FIGS. 5A-5I, wherein the lead screw is partially enclosed by a shroud or housing 148, the follower on the threads of the lead screw 118 is an internally threaded nut 188, shown in FIG. 5F. In an exemplary embodiment, nut 188 includes a body 190 with an interiorly threaded aperture 191 and a tail 192.

Figure 5G:
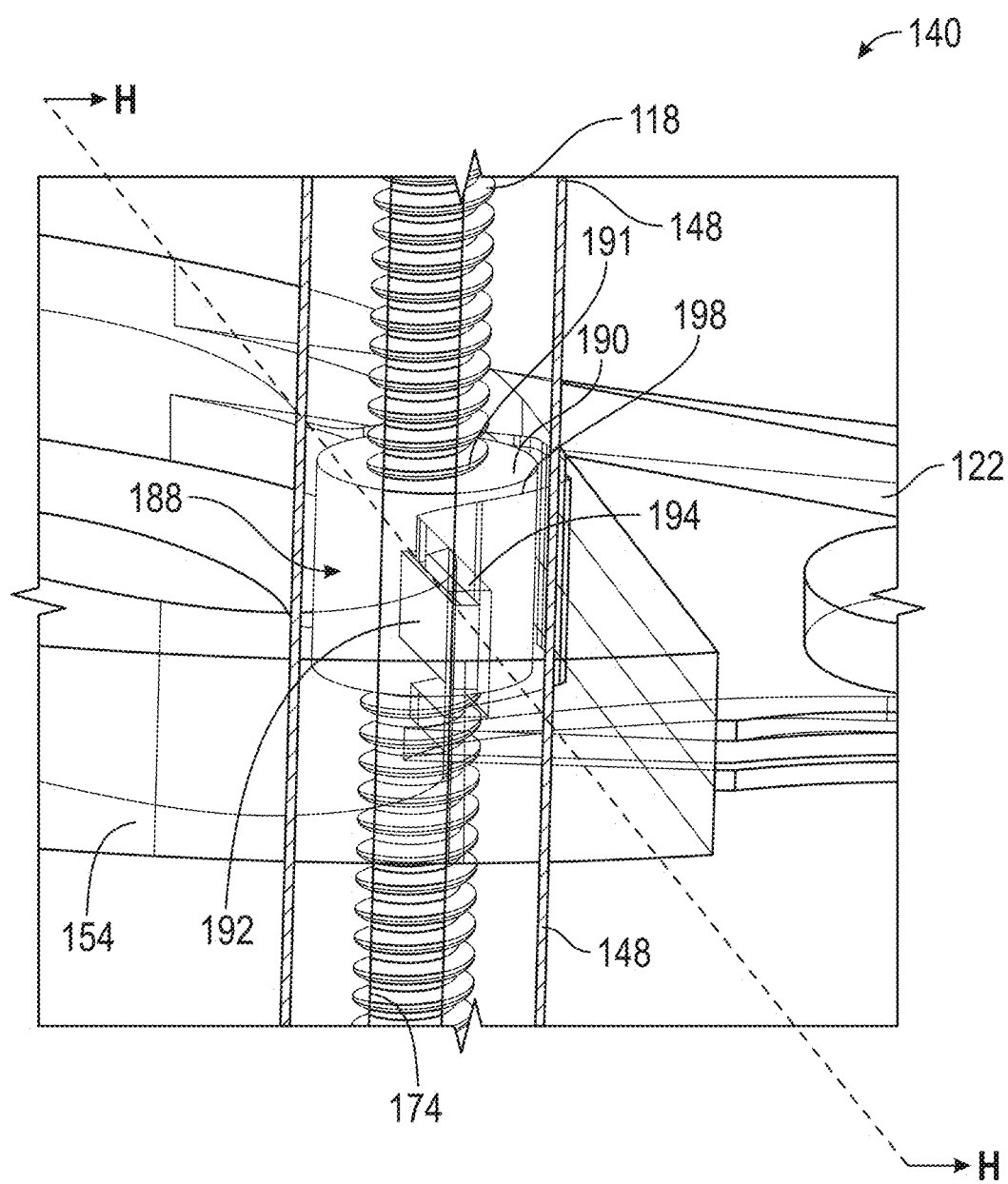
FIG. 5G is an enlarged partial perspective view of the lead screw and actuator arm assembly.
Figure 5H:
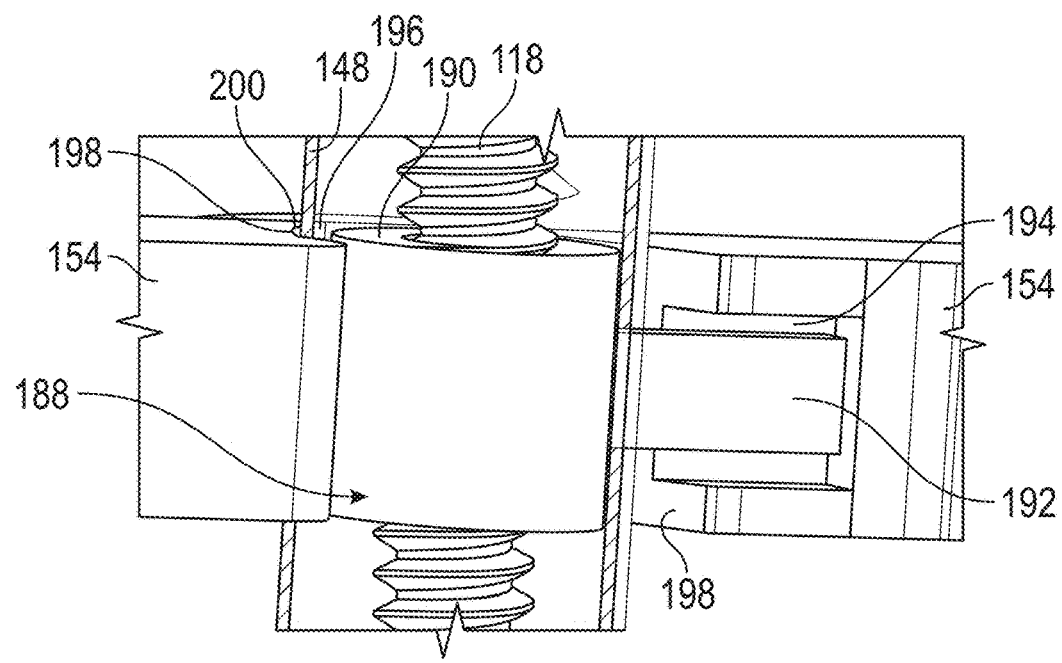
FIG. 5H is an interior view of the connection between the arm bracket and the lead screw, taken at line H-H of FIG. 5G.
Figure 5I:
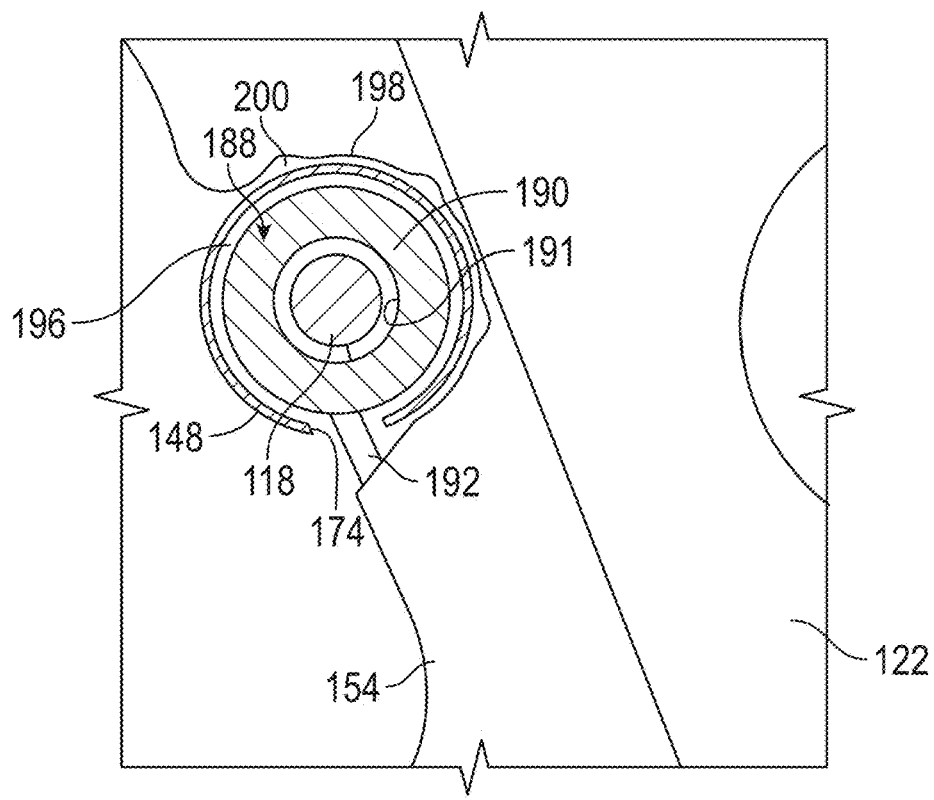
FIG. 5I is a partial cross-sectional view taken at line I-I of FIG. 5D.

In FIG. 5G, screw housing 148 and arm bracket 154 are shown as transparent so that relative positions of components are visible. In an exemplary embodiment, nut 188 travels up and down the lead screw 118 by cooperation of the external threads of the lead screw 118 and the internal threads of aperture 191 of the nut body 190. Tail 192 extends from body 190 and is fixed to surface 194 of arm bracket 154. As shown in FIGS. 5G and 5I, the tail 192 extends outward from the housing 148 through slit 174. Thus, this physical connection of tail 192 to surface 194 of arm bracket 154 causes the arm 122 to move up and down as the threaded nut 188 travels along the lead screw 118. As shown in FIGS. 5H and 5I, a gap 196 is maintained between body 190 and housing 148 so that the threaded nut 188 can freely move vertically in a z-direction along the lead screw 118. Moreover, a gap 200 is maintained between the housing 148 and recess 198 in arm bracket 154, which surrounds the lead screw housing 148. Thus, the entire arm bracket 154 and its attached arm 122 are able to move freely in a vertical z-direction along the lead screw 118.

Exemplary, non-limiting embodiments of a data storage device 100 are described. In an exemplary embodiment, a data storage device 100 comprises a data storage disk 104, an arm 122, a first head 102, an elevator 140, and a sleeve 148. In an exemplary embodiment, the data storage disk 104 has a first read/write surface defining an x-y plane. In an exemplary embodiment, the arm 122 is attached to a pivot block 132, wherein the arm 122 is movable relative to the disk 104. In an exemplary embodiment, the first head 102 is supported by the arm 122, wherein the first head 102 is configured to interact with the first read/write surface. In an exemplary embodiment, the elevator 140 is configured to move the arm in a z direction, wherein the elevator 140 comprises a stepper motor 112, a gear train 116, and a lead screw 118. The sleeve 148 partially encases the lead screw 118.

In an exemplary embodiment, the gear train 116 comprises a drive gear 158 and a driven gear 162. In an exemplary embodiment, the drive gear 158 is operably connected to the stepper motor 112. In an exemplary embodiment, the driven gear 162 is intermeshed with the drive gear 158. In an exemplary embodiment, the driven gear 162 is operably connected to the lead screw 118. In an exemplary embodiment, a housing 146 encases the gear train 116.

In an exemplary embodiment, a nut 188 comprises a first aperture 191, wherein the first aperture 191 is internally threaded and configured to travel in the z direction along an externally threaded surface of the lead screw 118. In an exemplary embodiment, a bracket 154 connects the nut 188 to the arm 154. In an exemplary embodiment, the nut 188 comprises a tail 192 configured to attach to the bracket 154.

In an exemplary embodiment, a linear bearing 156 is attached to the bracket 154. In an exemplary embodiment, a guide shaft 150 passes through the linear bearing 156. In an exemplary embodiment, a cap 172 attaches the sleeve 148 to the pivot block 132. In an exemplary embodiment, the sleeve 148 comprises an elongated slot 174 oriented in the z direction and positioned to face away from the data storage disk 104. In an exemplary embodiment, a tail 192 attached to the body 190 of the nut 188 is configured to travel in the z direction within the elongated slot 174.

In an exemplary embodiment, a data storage device 100 comprises a data storage disk 104, an arm 122, a first head 102, an elevator 140, and a housing 146. In an exemplary embodiment, the data storage disk 104 has a first read/write surface defining an x-y plane. In an exemplary embodiment, the arm 122 is attached to a pivot block 132, wherein the arm 122 is movable relative to the disk 104. In an exemplary embodiment, the first head 102 is supported by the arm 122, wherein the first head 102 is configured to interact with the first read/write surface. In an exemplary embodiment, the elevator 140 is configured to move the arm in a z direction, wherein the elevator 140 comprises a stepper motor 112, a gear train 116, and a lead screw 118. In an exemplary embodiment, the housing 146 encases the gear train 116 and is attached to the pivot block 132.

In an exemplary embodiment, a bracket 154 connects the lead screw 118 to the arm 122. In an exemplary embodiment, the bracket 154 comprises a first aperture 164, wherein the first aperture 164 is internally threaded and configured to travel in the z direction along an externally threaded surface of the lead screw 118. In an exemplary embodiment, a linear bearing 156 is attached to the bracket 154. In an exemplary embodiment, a guide shaft 150 passes through the linear bearing 156.

In an exemplary embodiment, the pivot block 132 comprises a plate 180 positioned at an end of the guide shaft. In an exemplary embodiment, a load beam 120 supports the first head 102, and the load beam 120 is configured to pivot with respect to the arm 122. In an exemplary embodiment, a second head 102b is supported by the arm 122 and configured to interact with a second read/write surface.

The illustrations of the embodiments described herein are intended to provide a general understanding of the structure of the various embodiments. The illustrations are not intended to serve as a complete description of all of the elements and features of apparatus and systems that utilize the structures or methods described herein. Features described with respect to any embodiment also apply to any other embodiment. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. All patent and application documents mentioned in the description are incorporated by reference.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to fewer than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. For example, features described with respect to one embodiment may be incorporated into other embodiments. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A data storage device comprising:
  a data storage disk having a first read/write surface defining an x-y plane;
  an arm attached to a pivot block, wherein the arm is movable relative to the disk;
  a first head supported by the arm, wherein the first head is configured to interact with the first read/write surface;
  an elevator configured to move the arm in a z direction, wherein the elevator comprises a stepper motor, a gear train, and a lead screw; and
  a sleeve partially encasing the lead screw.

2. The data storage device of claim 1, wherein the gear train comprises:
  a drive gear operably connected to the stepper motor; and
  a driven gear intermeshed with the drive gear, the driven gear operably connected to the lead screw.

3. The data storage device of claim 2 comprising a nut that comprises a first aperture, wherein the first aperture is internally threaded and configured to travel in the z direction along an externally threaded surface of the lead screw.

4. The data storage device of claim 3 comprising a bracket connecting the nut to the arm.

5. The data storage device of claim 4, wherein the nut comprises a tail configured to attach to the bracket.

6. The data storage device of claim 4 comprising a linear bearing attached to the bracket.

7. The data storage device of claim 6 comprising a guide shaft that passes through the linear bearing.

8. The data storage device of claim 1 comprising a cap by which the sleeve is attached to the pivot block.

9. The data storage device of claim 1, wherein the sleeve comprises an elongated slot oriented in the z direction and positioned to face away from the data storage disk.

10. The data storage device of claim 9 comprising a nut comprising:
  a body comprising an internally threaded aperture configured to travel in the z direction along an externally threaded surface of the lead screw; and
  a tail attached to the body and configured to travel in the z direction within the elongated slot.

11. The data storage device of claim 1 comprising a housing encasing the gear train.

12. A data storage device comprising:
  a data storage disk having a first read/write surface defining an x-y plane;
  an arm attached to a pivot block, wherein the arm is movable relative to the disk;
  a first head supported by the arm, wherein the first head is configured to interact with the first read/write surface;
  an elevator configured to move the arm in a z direction, wherein the elevator comprises a stepper motor, a gear train, and a lead screw; and
  a housing encasing the gear train and attached to the pivot block.

13. The data storage device of claim 12 comprising a load beam that supports the first head, wherein the load beam is configured to pivot with respect to the arm.

14. The data storage device of claim 12 comprising a bracket connecting the lead screw to the arm.

15. The data storage device of claim 14, wherein the bracket comprises a first aperture, wherein the first aperture is internally threaded and configured to travel in the z direction along an externally threaded surface of the lead screw.

16. The data storage device of claim 15 comprising a linear bearing attached to the bracket.

17. The data storage device of claim 16 comprising a guide shaft that passes through the linear bearing.

18. The data storage device of claim 17, wherein the pivot block comprises a plate positioned at an end of the guide shaft.

19. The data storage device of claim 12, wherein the gear train comprises:

a drive gear operably connected to the stepper motor; and
a driven gear intermeshed with the drive gear, the driven gear operably connected to the lead screw.

20. The data storage device of claim 19 comprising a second head supported by the arm and configured to interact with a second read/write surface.

* * * * *